United States Patent
Enke et al.

(10) Patent No.: US 9,871,792 B2
(45) Date of Patent: Jan. 16, 2018

(54) HOSTLESS MDNS-SD RESPONDER WITH AUTHENTICATED HOST WAKE SERVICE

(71) Applicant: GoPro, Inc., San Mateo, CA (US)

(72) Inventors: Joseph Anthony Enke, San Francisco, CA (US); David Boone, Belmont, CA (US); Jeffrey S. Youel, Rancho Santa Fe, CA (US); Bich Nguyen, Los Altos, CA (US); Mark Petersen, San Diego, CA (US); Kevin Fry, Escondido, CA (US)

(73) Assignee: GoPro, Inc., San Mateo, CA (US)

( * ) Notice: Subject to any disclaimer, the term of this patent is extended or adjusted under 35 U.S.C. 154(b) by 122 days.

(21) Appl. No.: 14/864,787

(22) Filed: Sep. 24, 2015

(65) Prior Publication Data

US 2016/0099940 A1    Apr. 7, 2016

Related U.S. Application Data

(60) Provisional application No. 62/059,825, filed on Oct. 3, 2014.

(51) Int. Cl.
    *H04L 29/06* (2006.01)
    *H04W 12/06* (2009.01)
    (Continued)

(52) U.S. Cl.
    CPC ......... *H04L 63/0876* (2013.01); *H04W 12/06* (2013.01); *H04W 52/0209* (2013.01);
    (Continued)

(58) Field of Classification Search
    CPC .................................................. H04L 63/0876
    (Continued)

(56) References Cited

U.S. PATENT DOCUMENTS

| 8,458,483 B1 | 6/2013 | Bailey et al. |
| 2003/0120929 A1* | 6/2003 | Hoffstein ............... H04L 9/3247 |
| | | 713/176 |

(Continued)

FOREIGN PATENT DOCUMENTS

WO    WO 2014/144753 A1    9/2014

OTHER PUBLICATIONS

PCT International Search Report and Written Opinion for PCT/US2015/052740, dated Jan. 28, 2016, 15 Pages.
(Continued)

*Primary Examiner* — Longbit Chai
(74) *Attorney, Agent, or Firm* — Fenwick & West LLP (57) ABSTRACT

Conventional wireless interface (WiFi) controllers cannot resolve authentication for trusted client devices without calculation from a host processor. Leaving the host processor on or awaking it from a sleep state each time a non-authenticated trusted client device attempts to connect wastes power. A hostless authenticated wake service allows a host controller to enter a sleep state while the WiFi controller responds to multicast domain name service-service discovery (mDNS-SD) queries from trusted client devices. Once a client device is authenticated, the WiFi controller may respond to a trusted client request to awake the host processor for further command processing and service provision. Not only does this approach reduce power consumption by allowing the host processor to remain in the sleep state, it allows trusted client devices to discover its presence while ensuring security.

27 Claims, 4 Drawing Sheets

(51) Int. Cl.
*H04W 52/02* (2009.01)
*H04L 29/12* (2006.01)

(52) U.S. Cl.
CPC ....... *H04L 61/1511* (2013.01); *H04L 63/0492* (2013.01); *Y02B 60/50* (2013.01)

(58) Field of Classification Search
USPC ........................................................ 713/170
See application file for complete search history.

(56) References Cited

U.S. PATENT DOCUMENTS

| | | |
|---|---|---|
| 2005/0114716 A1 | 5/2005 | O |
| 2005/0223248 A1 | 10/2005 | Lim et al. |
| 2008/0170569 A1 | 7/2008 | Garg et al. |
| 2011/0202983 A1 | 8/2011 | Pope et al. |
| 2012/0213134 A1 | 8/2012 | Woo et al. |
| 2013/0142136 A1 | 6/2013 | Pi et al. |
| 2014/0359148 A1* | 12/2014 | Cherian ................. H04L 41/28 709/229 |
| 2016/0066184 A1* | 3/2016 | Bhargav-Spantzel .. G06F 21/40 726/7 |

OTHER PUBLICATIONS

PCT Invitation to Pay Additional Fees and, Where Applicable, Protect Fee for PCT/US2015/052740, dated Nov. 13, 2015, 2 Pages.
Extended European Search Report for European Patent Application No. EP 15846322.4, dated Aug. 17, 2017, 7 Pages.

\* cited by examiner

HOSTLESS MDNS-SD RESPONDER WITH AUTHENTICATED HOST WAKE SERVICE

CROSS REFERENCE TO RELATED APPLICATIONS

This application claims the benefit of U.S. Provisional Application No. 62/059,825, filed Oct. 3, 2014, the content of which is incorporated by reference in its entirety.

BACKGROUND

Field of Art

The disclosure generally relates to the field of hostless authenticated wake service for electronic devices.

Description of the Related Art

A host processor is the main component of a host device and is responsible for executing complex procedures. For example, in a camera system, the host processor implements image capture, rendering, and storage. The host processor is idle when the host device is waiting to be queried by multicast domain name service-service discovery (mDNS-SD) enabled devices over a wireless interface (WiFi) network. If the host processor is turned off then a large amount of host device power can be saved. Currently, turning the host processor off while waiting to be queried removes the ability of the host device to respond to queries and provide services. Therefore, there is a lacking mechanism to provide for an mDNS responder with an authenticated wake service that does not require operation of the host processor.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
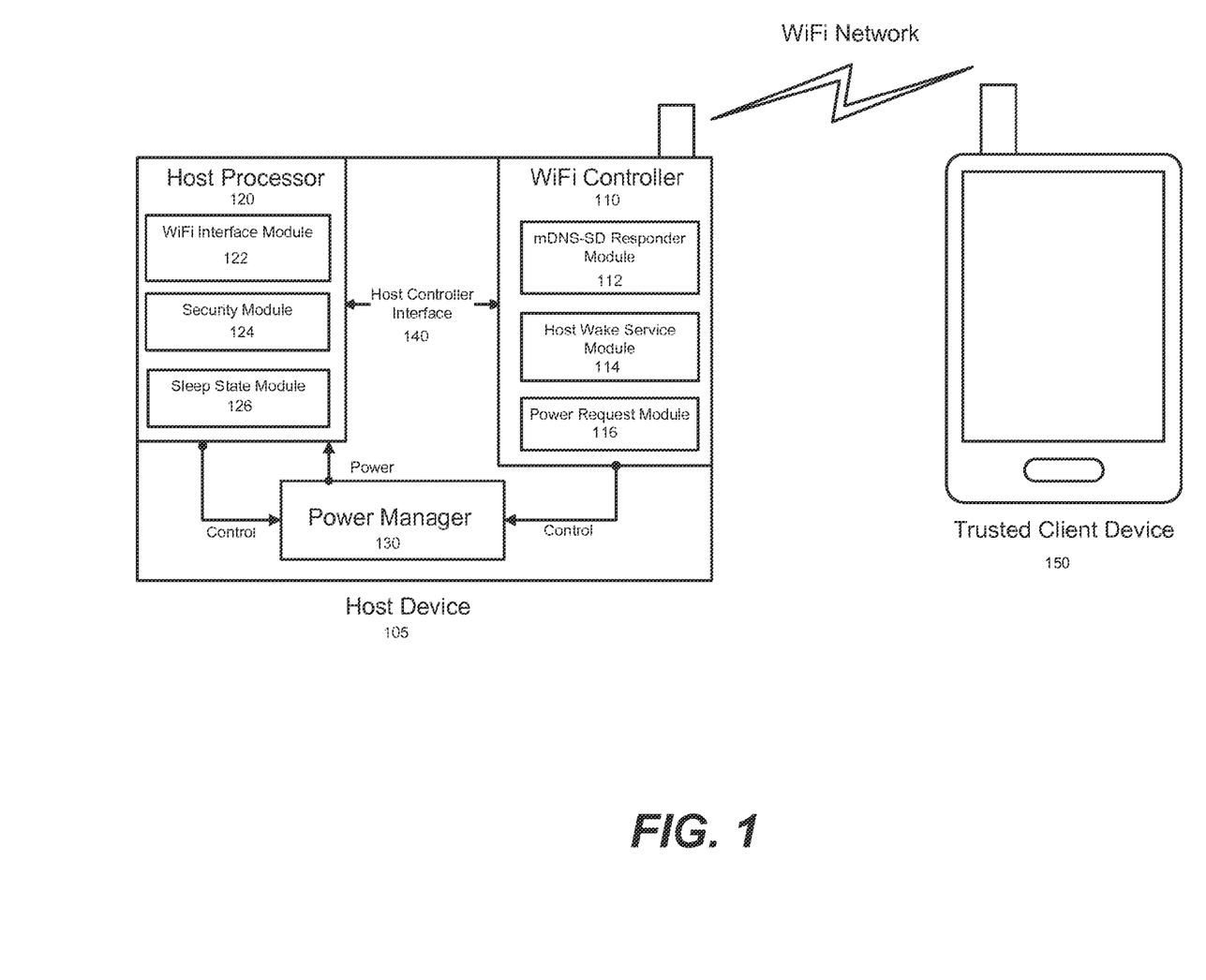
FIG. 1 is a diagram illustrating functionality of a host device that contains an mDNS-SD responder enabled WiFi controller and a hostless authenticated wake service.

FIG. 1 is a diagram illustrating functionality of a host device that contains an mDNS-SD responder enabled WiFi controller and a hostless authenticated wake service. Both the host device 105 and the trusted client device 150 include conventional computing system components such as one or more processors, a memory, a storage device, and network interfaces. The memory and storage device can store instructions corresponding to processes and modules as further described below that are executable by a processor.

The host device 110 includes a WiFi controller 110, a host processor 120, a power manager 130, and a host interface controller 140. The host device 105 may be any suitable hand-held computerized device, such as a camera, tablet, smart phone, and other systems including components for performing the described actions. Accordingly, the host device 105 may include various additional features, modules, and elements according to various embodiments. In one embodiment, the host device 105 communicates wirelessly through a network to a WiFi controller 110 on the trusted client device 150. In another embodiment, the trusted client device 150 may communicate wirelessly through the internet to a trusted client device 150 that does not have a wireless interface controller. The trusted client device 150 may also include various additional features, modules and elements according to various embodiments.

Figure 2:
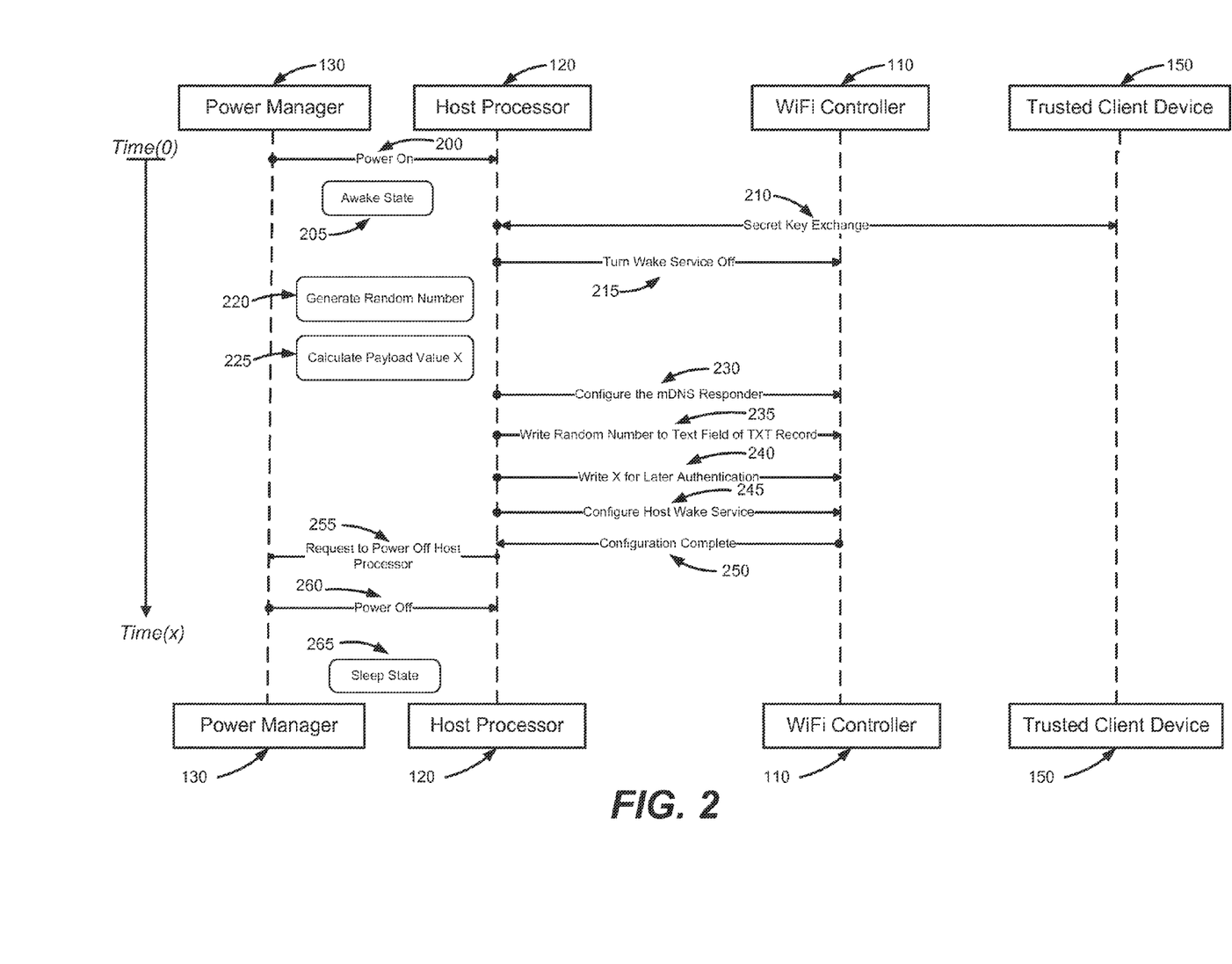
FIG. 2 illustrates a sequence in which a WiFi controller is configured with an mDNS-SD responder and an authenticated host wake service by a host processor.
Figure 3:
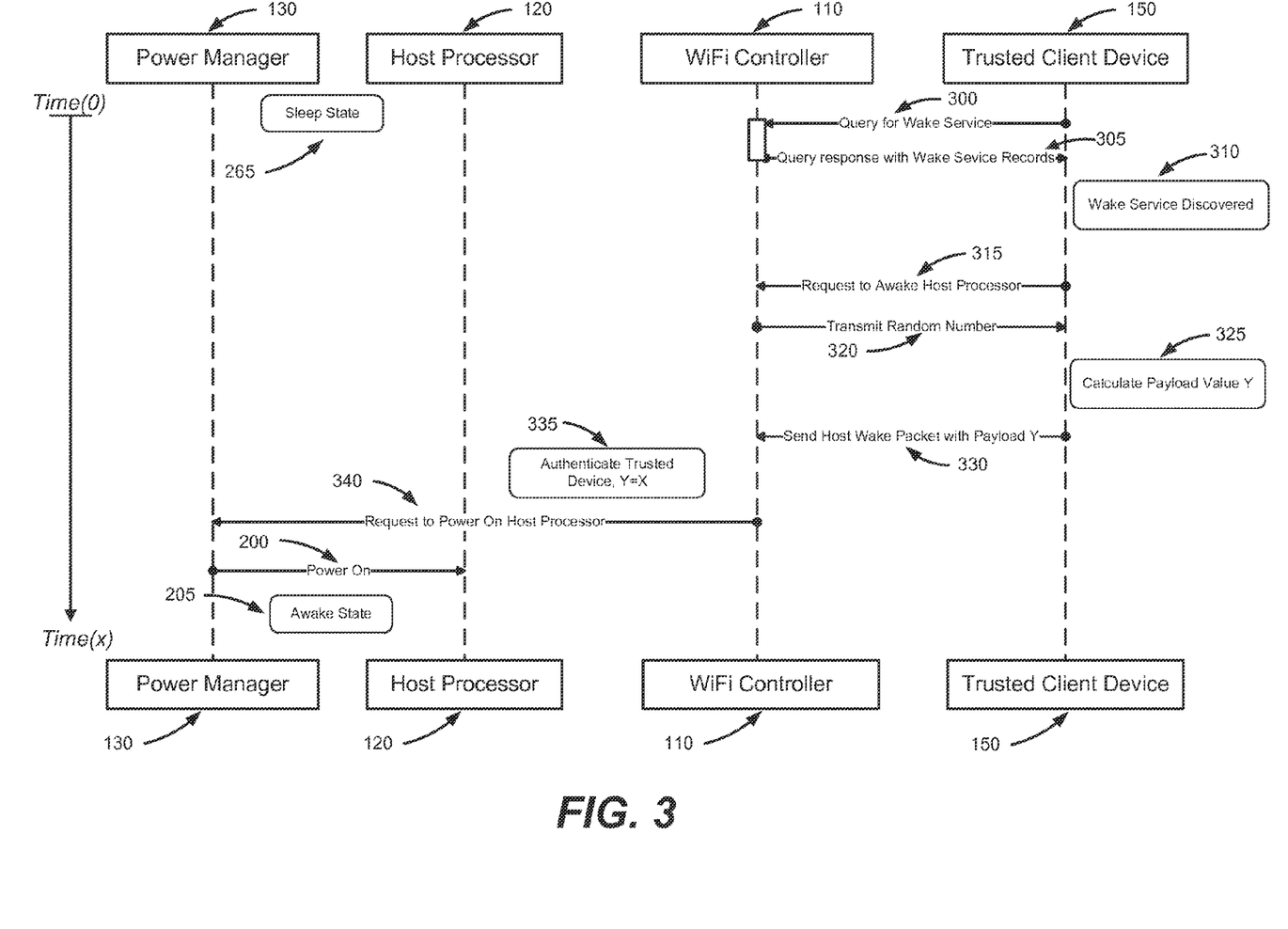
FIG. 3 illustrates a sequence in which a trusted client device is authenticated with a hostless wake service.

A WiFi controller 110, in one embodiment, is an integrated circuit that allows wireless communication between devices operating with the IEEE 802.11 protocol. The WiFi controller 110 encapsulates the protocols needed to interface between the host processor 130 and a trusted client device 150. The WiFi controller 110 contains a fixed and limited amount of available memory that may be used by the host processor 120 to configure and store an mDNS-SD responder module 111, a host wake service module 112, and a power request module upon the host device 105 boot up. Once configured the WiFi controller 110 may send a configuration complete signal 250 to the host processor 110 indicating the modules are configured. The configuration complete signal 250 prompts the host processor 110 to request a power off 260 in order to reduce power consumption. The configuration of the modules allow host processor 110 to enter a sleep state 265 while the WiFi controller 110 responds 305 to mDNS-SD queries, and authenticates 335 trusted client devices 150.

The mDNS-SD responder module 112 is configured 230 and stored on the memory of the WiFi controller 110 upon boot up of the host device 105. The mDNS-SD responder module 112 allows the host processor 120 to power off 260 to the sleep state 265. While the host processor 120 is in the sleep state 265, the mDNS-SD responder module 112 may receive mDNS-SD queries 300. These queries allow a trusted client device 150 to discover available services 310 provided by the host device 105. The mDNS-SD responder 112 may then respond to queries by sending mDNS-SD responses with packets that contain available service, protocol, and locating information. The mDNS-SD responder module 112 may allow service discovery of any available services, including the authenticated host wake service.

The host wake service module 114 authenticates 335 trusted client devices 150 and awakens the host processor 120 after an authentication 335 occurs. The host wake service module 114 is configured and stored on the memory of the WiFi controller 110 upon host processor 120 boot up. To awake the host processor 120 from the sleep state 265, shown in FIG. 2, the host wake service module 114 must receive a request from a trusted client device 150. The host wake service module 114 may then transmit a calculated random number 325 to the trusted client device 150. The host wake service module 114 then receives 330 a trusted client device payload value, generated with the random number. The random number and a host processor 120 payload are stored in the memory of the WiFi controller during configuration of the host wake service module 114. The host wake service module 114 compares the payload values. If the payload values of the host processor 120 and the trusted client device 114 match, then an authentication 335 occurs and the host processor 120 is placed in the awake state 205. If the authentication 335 fails, the connection is rejected and the host processor 120 remains in the sleep state 265, as shown in FIG. 2. Any client device that is not trusted will not be authenticated 335, as shown in FIG. 3, by the host wake service module 114.

The power request module 116 is an interface between the WiFi controller 110 and the power manager 140. The power request module 116 receives, from the host wake service module 122, a request to power on 340 the host processor. The power request module 116 thereafter relays the request to power on 340 the host processor to the power manager 130.

The host processor 120 is the main processing unit for the host device 105 and contains a WiFi configuration module 122, security module 124, and sleep state module 126. Additionally, the host processor 120 may store data in memory, communicate to peripherals over communication interfaces and/or busses, perform signal and/or image processing, process data wirelessly over a network, and/or perform other complex instruction processing. In various embodiments the host processor 120 is an application processor or a microcontroller. An mDNS-SD responder module 112 with a host wake service module 114 allow the host processor 120 to remain in the sleep state 265 while the system is controlled by a trusted client device 150 over WiFi, shown in FIG. 2, waiting start an operation.

A WiFi interface module 122 is located on the host processor 120, it configures and stores 230 the mDNS-SD responder module 112 on the available memory of the WiFi controller 110. The module also configures and stores 245 the host wake service module 114 on the WiFi controller 110. Both modules are configured and stored at the boot up time of the host processor 120. Additionally, the WiFi interface module 122 also synchronizes the power state of the host processor 120 and the WiFi controller 110. The WiFi interface module 122 may initiate a sleep state 265 for the host processor 120 by sending a request to power off 255 to the sleep state module 126. The WiFi interface module 122 then sends a status signal to the WiFi controller 110 indicating it is entering a sleep state 265.

The security module 126, executed by the host processor 120, is responsible for exchanging 210 and storing keys with remote client devices, generating random numbers 220, and calculating payload values 225 as shown in FIG. 2. The key exchange 210, is part of a WiFi pairing process that occurs after a remote client becomes a trusted client device 150. The key is stored and used in conjunction with a random number to authenticate 335, as shown in FIG. 3, a trusted client device 150. The random number is a one-time use value that is generated 220, as shown in FIG. 2, by the security module 126. Both the random number and secret key are used to calculate a value that authenticates 335, as shown in FIG. 3, a trusted client device 150. The resulting value is called a payload, it is sufficiently large and will reset each time the host processor enters the sleep state 265 so that it cannot be guessed. The random number and payload value are transmitted and stored on the WiFi controller 110 for later transmission to a trusted client device 150.

The sleep state module 126 is an interface between the host processor 120 and the power manager 140. The sleep state module 126 receives, from the WiFi configuration module 122, a request to power off 255 the host processor 120, as shown in FIG. 2. The request to power off 255 the host processor is initiated after the WiFi configuration module 122 receives a configuration complete 250 signal from the WiFi controller 110. The configuration complete 250 signal indicates the host processor 120 may enter the sleep state 265 now the mDNS-SD responder 112 and host wake service module 114 are configured. The sleep state module 126 thereafter relays the request to power off 255 the host processor 120 to the power manager 130.

The power manager 140, in one embodiment, is an integrated circuit that governs the power state of the host processor 120. The power manager 140 receives request to power off 255 from the host processor 120 and power on request 340 from the WiFi controller 110. Once a request is received to change the power state of the host processor 130, the power manager 140 sends a power on 200 signal or power off 255 signal to the host processor 130. The power manager 140 does not initiate power sequencing on its own accord.

The host controller interface 140 is a communication interface between the host processor 130 and the WiFi controller 120. In various embodiments, the host processor 120 and WiFi controller 110 operate at different levels of protocol abstraction; the host controller interface 140 bridges this gap and standardizes message packets. The host controller interface 140 may be implemented in communication busses such as universal asynchronous receiver/transmitter (UART), serial peripheral interface (SPI), universal serial bus (USB), secure digital input output (SDIO). The host controller interface 140 may also be implemented as firmware logic on the same processor as the host processor 120 or the WiFi controller 110.

Referring now to FIG. 2, it illustrates a sequence in which a WiFi controller 110 is configured with an mDNS-SD responder module 112 and a host wake service module 114. The host processor 120 receives a power on 200 signal from the power manager 130. The power on 200 signal places the host processor 130 in the awake state 205. As part of a WiFi pairing process, a secret key is exchanged 210 between the host processor 120 and the trusted client device 150. In order to configure and store the modules required for hostless mDNS-SD responses, the host processor 120 turns off its currently running mDNS-SD responder. A random number is generated 220 by the host processor 120 and used in a cryptographic hash function to calculate the host processor payload value 225. The host processor 120 configures 230 and stores the mDNS-SD responder module 112 on the WiFi controller's 110 available memory. The random is number written 235, by the host processor 120, to memory of the WiFi controller 110. The host processor's payload value 120 is written 240 to the memory of the WiFi controller 110 for later authentication 335. The host processor 120 then configures 245 and stores the host wake service module 114 on available memory of the WiFi controller 110. Once configuration 245 of the host wake service module is complete, a configuration complete 250 signal is sent to the host processor 120. The host processor 120 transmits a request to power off 255 itself to the power manager 130. Upon receiving the power off request the power manager 130 sends a power off 260 signal to the host processor 120. The host processor 120 then enters the sleep state 265.

Turning to FIG. 3, it illustrates a sequence in which a trusted client device 150 is authenticated with a hostless wake service. The host processor 120 is initially in the sleep state 265 with the WiFi controller 110 handling mDNS-SD queries from trusted client devices 150. The trusted client device 150 queries 300 the WiFi controller 110 for any services available. The WiFi controller 110 responds 305 to the query 300 with a list of services. The trusted client 150 receives the list of available services and discovers 310 wake service is available. The trusted client device 150 then sends a request to awake 315 the host processor 120. The WiFi controller 110 transmits 320 a random number to the trusted client device 150. The trusted client device 150 calculates 325 the payload value with the random number and the previously exchanged key. The result is sent 330 to the WiFi controller where the payload values of the trusted client device 150 and the host device 105 are compared. If the values do not match, an authentication 335 is denied and the connection is dropped. If the values match, an authentication 335 occurs and request to power on 340 the host processor 120 is sent by the WiFi controller 110 to the power manager 140. The power manager 140 sends a power on 200 signal to the host processor 120. The host processor 120 enters the awake state 205 and become available to communicate with the trusted client device 150.

Computing Machine Architecture

Figure 4:
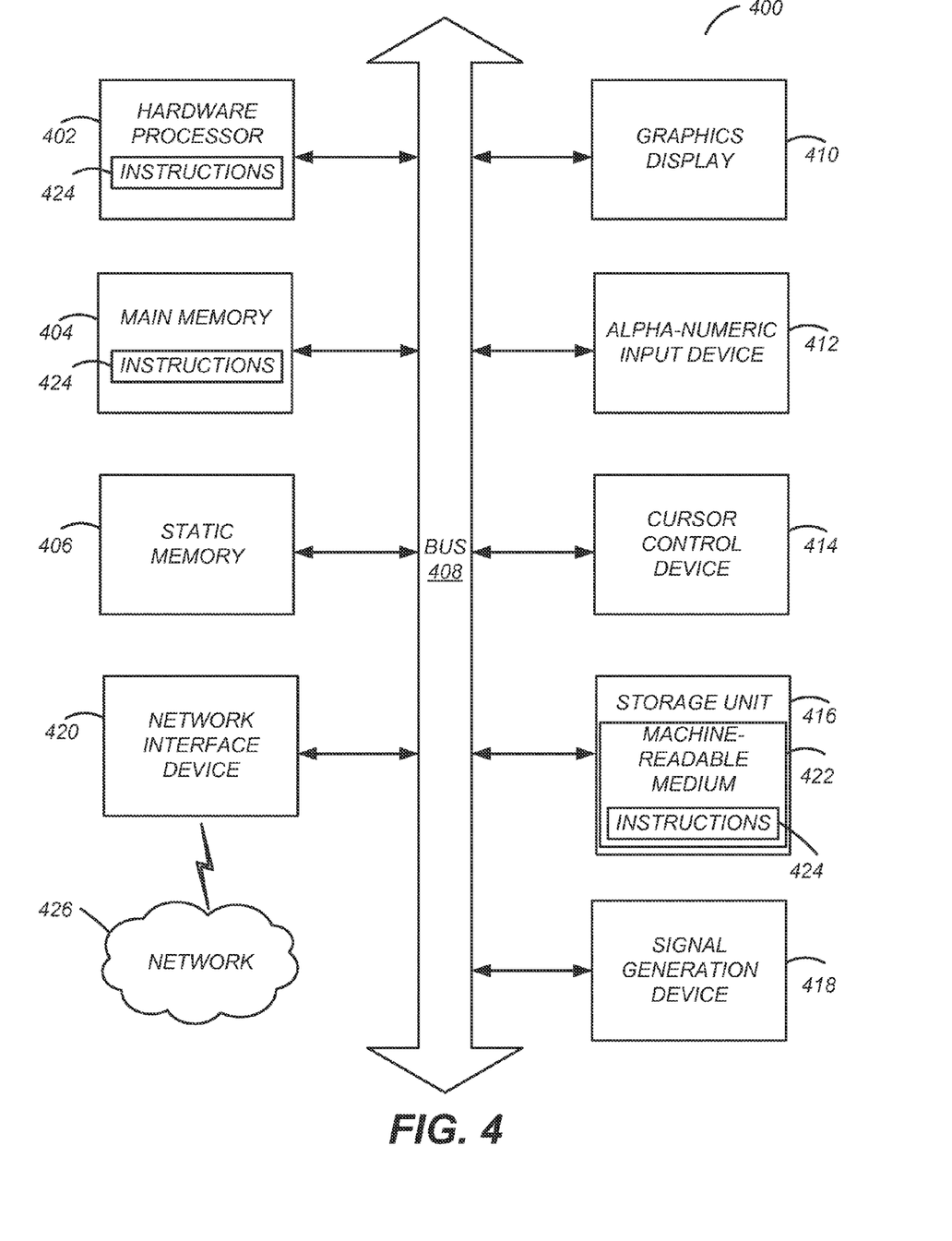
FIG. 4 illustrates one embodiment of components of an example machine able to read instructions from a machine-readable medium and execute them in a processor (or controller).

Turning now to FIG. 4, the figure is a block diagram illustrating components of an example machine able to read instructions from a machine-readable medium and execute them in a processor (or controller). Specifically, FIG. 4 shows a diagrammatic representation of a machine in the example form of a computer system 400 within which instructions 424 (e.g., software or program code) for causing the machine to perform (execute) any one or more of the corresponding methodologies created on the client device 150. The computer system 400 may be used for one or more of the entities (e.g. trusted client device 150) illustrated in the functional environment of FIG. 1.

The example computer system 400 includes a hardware processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

As is known in the art, a computer system 400 can have different and/or other components than those shown in FIG. 4. In addition, the computer system 400 can lack certain illustrated components. For example, a computer system 400 acting as the host device 105 may include a hardware processor 402, a storage unit 416, a network interface device 420, and a WiFi controller 110 (as described above with reference to FIG. 1), among other components, but may lack an alphanumeric input device 412 and a cursor control device 414.

Additional Configuration Considerations

A hostless mDNS-SD responder with authenticated wake service is configured on a WiFi controller to allow a host processor 120 to enter a sleep state 265. This allows the WiFi controller 110 to act as mDNS-SD responder and perform an authenticated host wake service typically reserved for the host processor 120. This approach reduces power consumption by allowing the host processor to remain in the sleep state 265 while simultaneously adding security by verifying payload values of the trusted client device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, 3, and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, or an application-specific integrated circuit (ASIC)) to perform certain operations. A hardware module may also comprise programmable logic or circuitry (e.g., such as a field programmable gate array (FPGA) or encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., host processor 120, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a hostless mDNS-SD responder with an authenticated wake service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method to initiate a wake service using a multicast domain name system-service discovery (mDNS-SD) responder, the wake service to authenticate a trusted client device when a host processor is in a sleep state, the method comprising:
   configuring, by the host processor, the mDNS-SD responder and the wake host service in a communication controller before the host processor enters the sleep state;

receiving, by the mDNS-SD responder of the communication controller, a service discover query from a trusted client device while the host processor is in the sleep state in response to receiving, by the host processor, a signal indicating the mDNS-SD responder configuration is complete;

transmitting, through an mDNS-SD responder, a response to the service discovery request;

receiving, by the mDNS-SD responder in response to a wake service request, a payload value from the trusted client device to authenticate the trusted client device; and waking, in response to the trusted client device being authenticated, the host processor to connect with the trusted client device; and wherein the host processor enters a sleep mode while the mDNS-SD responder responds to mDSN-SD queries and authenticates the trusted client device.

2. The method of claim 1, wherein the host processor, prior to entering an initial sleep state, configures the mDNS-SD responder and wake host service for storage in a memory associated with the wireless interface (WiFi) controller.

3. The method of claim 2, wherein configuring the mDNS-SD responder further comprises:
transmitting, by the mDNS-SD responder upon completion of configuration, a signal to the host processor controller indicating the mDNS-SD responder configuration is complete.

4. The method of claim 1, wherein the mDNS-SD responder is configured on a WiFi controller to respond to mDNS-SD queries independent of the host processor.

5. The method of claim 1, wherein the wake host service configured on a WiFi controller further comprises:
receiving a wake request for the host processor from a trusted client device;
transmitting a randomly generated number to the trusted client device;
receiving a generated payload value from the trusted client device;
authenticating the generated payload value from the trusted client device; and
sending an wake request to a power management module.

6. The method of claim 5, wherein authenticating the generated payload value further comprises:
generating a payload value for the host device;
receiving a generated payload value from the trusted client device;
granting authentication if the payload value of the trusted client device matches the payload value of the host device; and
denying authentication and remaining in the sleep state if the payload value results do not match.

7. The method of claim 5, wherein in a generating the payload value further comprises:
calculating a payload as a result of a cryptographic hash function, the inputs being a secret key and a randomly generated number; and
storing the payload value in the memory of the WiFi interface controller.

8. The method of claim 7, wherein the payload value is reset each time the host processor enters the sleep state.

9. The method of claim 5, wherein receiving the wake request further comprises:
transmitting, by the power management module, a power on signal to the host processor;
receiving, by the host processor, a power on signal; and
powering on by the host processor.

10. A host device configured to communicate with one or more trusted client devices according to a host/client relationship in which a wake service discovery query sent from a trusted client device to the host device occurs waking the host device from a sleep state, the host device comprising:
a host processor configured to communicate, by a hardware processor, with a WiFi controller, power manager module, and one or more trusted client devices;
a WiFi controller configured to communicate to with the host processor, a power manager module, and one or more trusted client devices;
a power manager module configured to control the sleep state of the host processor;
wherein the WiFi controller is configured, with a multicast domain name system-service discover (mDNS-SD) responder and a wake host service before the host processor enters a sleep state;
wherein the host processor enters a sleep state while the mDNS-SD responder of the WiFi controller responds to a mDSN-SD query and authenticates one or more trusted client devices; and
wherein the host processor in a sleep state is responsive to receiving a signal indicating that the mDNS-SD responder configuration is complete.

11. The host device of claim 10, where communication with the WiFi controller by the host processor further comprises:
transmitting instructions for configuring an mDNS-SD responder for storage in a memory associated with the wireless interface (WiFi) controller;
transmitting instructions for configuring a wake host service for storage in a memory associated with the wireless interface (WiFi) controller; and
receiving a request to enter a sleep state.

12. The host device of claim 10, where communication with one or more trusted client devices by the host processor further comprises:
exchanging of a secret key while in a pair mode.

13. The host device of claim 10, where communication with the power manager module by the host processor further comprises sending a request to enter a sleep state.

14. The host device of claim 10, where communication with the host processor by the WiFi controller further comprises:
receiving instructions for configuring an mDNS-SD responder for storage in a memory associated with the wireless interface (WiFi) controller;
receiving instructions for configuring the wake host service for storage in a memory associated with the wireless interface (WiFi) controller; and
transmitting a request to enter the sleep state.

15. The host device of claim 10, where communication with one or more trusted client devices by the WiFi controller further comprises:
responding to mDNS-SD queries;
generating and authentication with the trusted client device; and
conforming to the IEEE 802.11 protocol.

16. The host device of claim 15, where responding to mDNS-SD queries further comprises sending packets to trusted client devices containing available services, protocol, and locating data.

17. The host device of claim 10, where communication with the power manager module by the WiFi controller further comprises sending a request to enter an awake state.

18. A non-transitory computer readable storage medium storing instructions to enable a wake service using a multicast domain name system-service discovery (mDNS-SD) responder, the wake service to authenticate a trusted client device when a host processor is in a sleep state, the method comprising:

configure, by the host processor and before entering the sleep state, the mDNS-SD responder and the wake host service in a communication controller;

receive, by the mDNS-SD responder of the communication controller, a service discover query from a trusted client device while the host processor is in the sleep state in response to receiving, by the host processor, a signal indicating the mDNS-SD responder configuration is complete;

transmit, through an mDNS-SD responder, a response to the service discovery request;

receive, by the mDNS-SD responder, in response to a wake service request, a payload value from the trusted client device to authenticate the trusted client device; and wake, in response to the trusted client device being authenticated, the host processor to connect with the trusted client device; and wherein the host processor enters a sleep mode while the mDNS-SD responder responds to mDSN-SD queries and authenticates the trusted client device.

19. The computer readable storage medium of claim 18, further comprising instructions that when executed cause the host processor, prior to entering an initial sleep state, to configure the mDNS-SD responder and wake host service for storage in a memory associated with the wireless interface (WiFi) controller.

20. The computer readable storage medium of claim 19, further comprising instructions for that when executed cause the mDNS-SD responder to send, upon completion of configuration, a signal to the host processor indicating the mDNS-SD responder configuration is complete.

21. The computer readable storage medium of claim 19, further comprising instructions for that when executed cause the host processor to enter the sleep state responsive to receiving the signal indicating the mDNS-SD responder configuration is complete.

22. The computer readable storage medium of claim 18, further comprising instructions that when executed cause the mDNS-SD responder configured on a WiFi controller to respond to mDNS-SD queries independent of the host processor.

23. The computer readable storage medium of claim 18, further comprising instructions that when executed cause the wake host service configured on a WiFi controller to:

receive a wake request for host processor from a trusted client device;

send a randomly generated number to the trusted client device;

receive a generated a payload value from the trusted client device;

authenticate the calculated payload; and send an wake request to a power management module.

24. The computer readable storage medium of claim 23, further comprising instructions that when executed cause the WiFi interface controller to:

generate a payload value for the host device;

receive a generated payload value from the trusted client device; and perform one of:

grant authentication if the payload value of the trusted client device matches the payload value of the host device, or deny authentication and remaining in the sleep state if the payload value results do not match.

25. The computer readable storage medium of claim 24, further comprising instructions that when executed cause an authentication module to:

calculate a payload as a result of a cryptographic hash function, the inputs being a secret key and a randomly generated number; and store the payload value in the memory of the WiFi interface controller.

26. The method of claim 25, wherein the payload value is reset each time the host processor enters the sleep state.

27. The computer readable storage medium of claim 23, wherein the wake request further comprises instructions that cause, in response to receiving an wake request, the power management module to transmit a power on signal to the host processor.

* * * * *